Nov. 20, 1973 D. G. HAFFNER Re. 27,813

HYDROSTATIC TRANSMISSION CONTROL FOR VEHICLES

Original Filed Jan. 3, 1969

INVENTOR:
DONALD G. HAFFNER
Arthur J. Hansmann
ATTORNEY

United States Patent Office

Re. 27,813
Reissued Nov. 20, 1973

27,813
HYDROSTATIC TRANSMISSION CONTROL FOR VEHICLES

Donald G. Haffner, Greendale, Wis., assignor to Jacobsen Manufacturing Company, Racine, Wis.

Original No. 3,541,878, dated Nov. 24, 1970, Ser. No. 788,796, Jan. 3, 1969. Application for reissue Aug. 10, 1972, Ser. No. 279,690
Int. Cl. G05g 7/12
U.S. Cl. 74—474 6 Claims

Matter enclosed in heavy brackets [ ] appears in the original patent but forms no part of this reissue specification; matter printed in italics indicates the additions made by reissue.

ABSTRACT OF THE DISCLOSURE

A hydrostatic transmission control for vehicles including a hydraulically responsive unit having a mechanical control shown to be in the form of a lever operatively connected with the hydraulic mechanism for selectively setting the latter into positions corresponding to a forward position and a reverse position and a neutral position for the vehicle. Spring means are connected to the lever to influence its position in opposition to a manual control member which is also connected to the lever for setting the hydraulic unit in a selected position. Further, the manual control is shown to be a foot pedal type of control, and stop means are associated with the control for limiting both forward and reverse positions of the hydraulic unit and thereby limiting the vehicle speed, as desired. The lever has adjusting means for setting it in a position corresponding to the neutral position, and the spring means is also arranged for automatically establishing the neutral position when the manual control is released.

This invention relates to a hydrostatic transmission control for vehicles. This invention has particular application to vehicles of the tractor type, such as garden tractors which utilize hydraulics for mobilizing the tractor.

BACKGROUND OF THE INVENTION

The prior art is established to the extent of employing hydraulics, and particularly hydraulically operative transmissions, in the powering and mobilizing of the tractor. That is, it is common practice to mobilize a vehicle by hydraulic power wherein a hydraulic pump is utilized to create hydraulic pressure and the pressurized fluid is conducted through a motor for driving the vehicle. Still further, it is common to have the hydrostatic unit of the drive operate in the form of a transmission which governs both the forward and reverse directions of drive and which also governs the speed of the drive and therefore the speed of the vehicle being driven. These hydrostatic units are commonly controlled by mechanism, such as levers which are operatively connected to the hydraulic pump for controlling the amount of fluid displacement as well as controlling the direction of fluid displacement through the pump for the forward and reverse functions mentioned.

The problems attending the prior units include the concern of establishing a neutral position for the hydrostatic unit, such that the vehicle will not be unintentionally driven when the hydrostatic unit is intended to be in a neutral position. This problem commonly exists because the hydrostatic control means cannot be located in the neutral position, nor can it be retained in the neutral position against the creeping and like conditions which are prevalent because of the hydrostatic fluid in the system. Still further, the hydrostatic units are manually controlled, and there is no effective and efficient type of control for setting the unit in the several positions mentioned.

Another problem with the prior art hydrostatic units is that of having the unit automatically progress from its desired position to a position of more extreme setting. For instance, the forward position in the prior hydrostatic units commonly induces the unit to seek a more extreme forward position so that the vehicle is actually running faster and faster in a given time. This is characteristic of the prior hydrostatic units since these units are subjected to high pressure fluid which is creating this advancing or self-progressing condition mentioned. Such condition exists in the pump section of the unit where the hydraulic pressure causes the pump to create greater pressure for a corresponding faster drive to the hydraulic motor or other power takeoff employed.

Still another shortcoming of the prior units is the lack of a foot pedal type of manual control for setting the hydrostatic system in the forward position and the reverse position and the neutral position, all with a single foot pedal control. Still further, the prior units do not have stops or adequate controls for limiting the setting of the manual control, such as a foot pedal, in the forward and reverse positions, and therefore the speed of the vehicle is not limited, though a limited speed in most vehicles is desirable.

The objects of the present invention are to overcome the problems and shortcomings of the prior art, as mentioned in the aforegoing. Specifically, the present invention provides a hydrostatic control unit which is arranged to be set in a positive neutral position. Still further, this positive neutral position is achieved automatically in the unit when the manual control is released. Another specific object of this invention is to provide a hydrostatic unit which does not entail creeping of the vehicle as caused by the self-energizing or self-progressing feature mentioned in connection with the prior art. Additionally, it is a consequence of the present invention to have the hydrostatic unit arranged so that the manual control can easily but definitely be set in its desired position. Also, the present invention provides a means for adjusting the manual control for setting the neutral position and also for determining the limit of both the forward speed and the reverse speed of the vehicle.

Other objects and advantages will become apparent upon reading the following description, and they also include the provision of the control for a hydrostatic unit, wherein the control is simplified, easy to manufacture, efficient and reliable in its function, and which is precise in its setting and easily serviced and adjusted and installed.

DETAILED DESCRIPTION OF THE PREFERRED EMBODIMENTS

Figure 1:
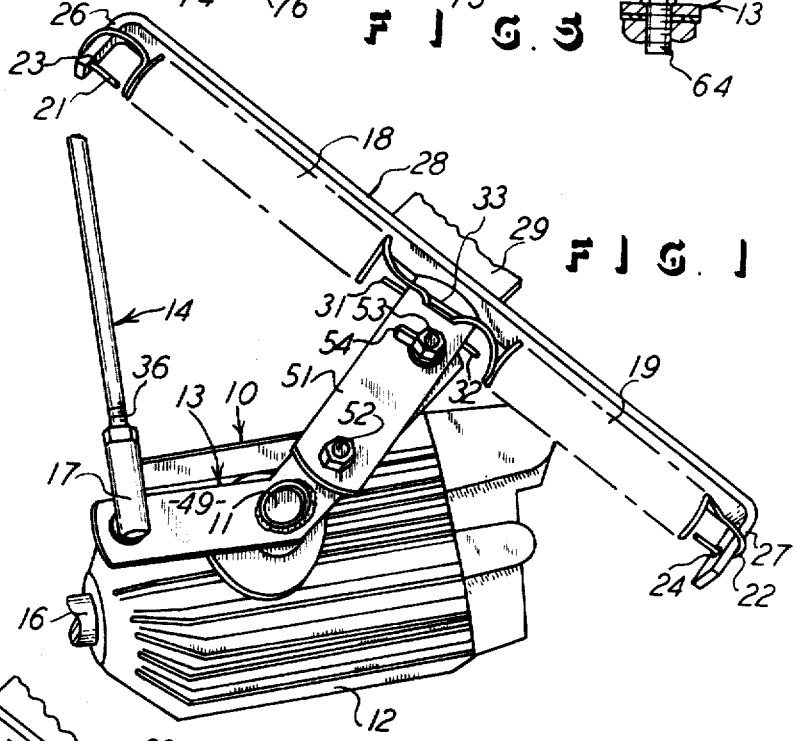
FIG. 1 is a top perspective view of one embodiment of this invention.

FIG. 1 shows a hydrostatic unit, generally designated 10, and it will be understood that this unit is of a conventional construction. A control shaft 11 extends outside the unit housing 12, and a control means in the form of a lever, generally designated 13, and a rod, generally designated 14, are connected with the shaft 11 for rotated positions of the shaft 11. Also, the unit 10 has a power input shaft 16 which may be driven through a pulley or any other conventional member.

Of course rotating the shaft 11 sets the hydrostatic unit in one of the three desired positions of forward, reverse, or neutral, for controlling the vehicle on which the unit is mounted. Thus, the manual control 14 is connected to the control lever 13 by means of an articulate connector 17. The other end of the lever 13 has spring means in the form of two tension springs 18 and 19 in FIG. 1. The arrangement is such that the spring means always exerts at least a minimum spring force to the control lever 13 in all positions of the control lever, and the force is exerted against the force applied to the control lever 13 by the rod 14.

To achieve the spring force mentioned, the embodiment in FIG. 1 is such that the spring 19 has an initial tension, for example a twenty pound tension. The spring 18 has an initial tension, for example an eight pound tension. The two springs have their respective ends formed in hooks 21 and 22, and these hooks extend through respective openings 23 and 24 in parallel ends 26 and 27 of a fixed bracket 28. That is, the bracket 28 is stationarily mounted on the vehicle proper, and such mounting may be by means of the member 29 which is affixed to the bracket 28 and which would also be affixed to the vehicle. The spring ends 31 and 32 hook into an elongated slot 33 in the end of the lever 13. Still further, the spring 18 is stretched in the position shown in FIG. 1 so that the spring extends tautly between the bracket end 26 and the lever slot 33. With the eight pound initial tension in the spring 18, and with the stretch of the spring to the position shown in FIG. 1, the spring 18 has a tension of, for instance, ten pounds in the position in FIG. 1. The spring 18 threfore holds the spring 19 in a taut but unstretched position, and the spring 19 therefore requires a force of approximately ten pounds to permit the lever 13 to move counter-clockwise, from the position shown in FIG. 1.

FIG. 1 shows the hydrostatic unit in the neutral position, and it will now be understood that a force of approximately ten pounds is exerted by each of the springs 18 and 19 on the lever 13 so that this force of approximately ten pounds must be overcome in order to move the unit out of the neutral position. In this manner, the hydrostatic unit is provided with a positive and accurate neutral position, as desired.

Figure 2:
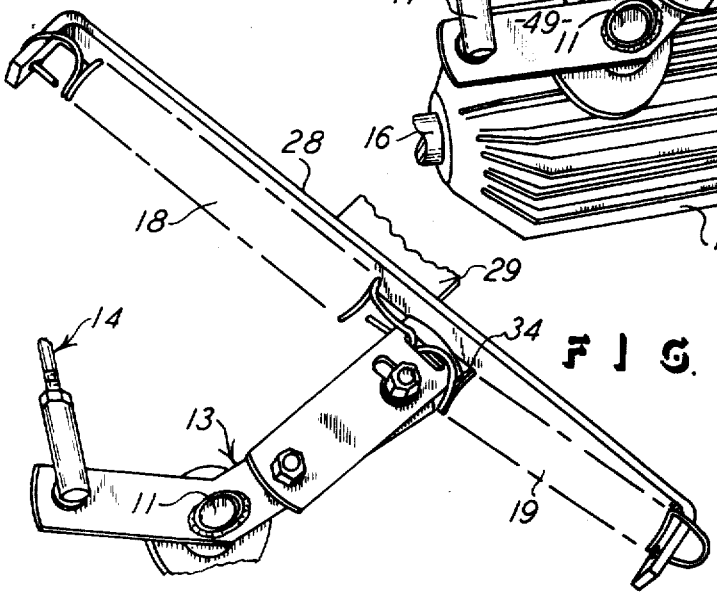
FIG. 2 is a top perspective view similar to FIG. 1 but with certain parts removed, and with the control in a different position.

Of course movement of the lever 13, and consequent rotation of the shaft 11, will set the hydrostatic unit in a forward or reverse direction for the corresponding drive to the vehicle. FIG. 2 shows the lever moved slightly clockwise from the position shown in FIG. 1, and this movement is in the direction which is to the reverse position. That is, the rod 14 has been axially moved from the position of FIG. 1, to induce the clockwise rotation of the lever 13, as mentioned. The spring 18 is therefore stretched and the spring 19 simply remains in its length shown in FIG. 1, but spring 19 now serves as a stop in that it rests against the bracket end 27 and against the lever end 34. This provides a limit to the amount of reverse speed which can be applied to the vehicle, as desired. Also, the rod 14 has its threaded end 36 extended into the connector 17 so that the amount of rotation of the lever 13 can be controlled, for both the forward and reverse positions as well as for the neutral position which is preferably achieved by another adjustment to be described later.

Figure 4:
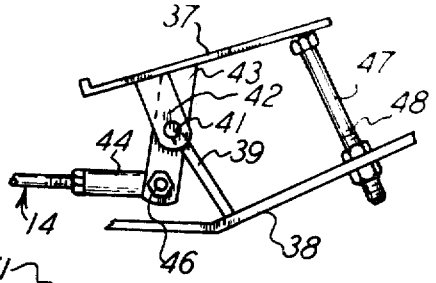
FIG. 4 is a side elevational view of the foot pedal portion of the control.

FIG. 4 shows the operator's control end of the manual control 14, and this is shown to be a pivotally mounted foot pedal 37 shown on the vehicle portion 38. A support 39 carries a pivot shaft 41 on which the pedal bars 42 and 43 are pivotally mounted. The bar 43 extends below the pivot shaft 41 and connects to the rod 14 through a connector 44 secured to the lower end of the bar 43 by means of the bolt 46. Thus, pivotal movement of the pedal 37 about the axis of the stationary shaft 41 will cause longitudinal displacement of the rod 14 and consequent rotation of the lever 13. FIG. 4 also shows a pedal or control limit in the form of a standard or bolt 47 stationarily mounted on the vehicle portion 38 and extending upwardly to abut the pedal 37 which is therefore shown in the fully forward position of pivot, and this position would assume the full forward position for the hydrostatic unit or transmission 10. However, the pedal 37 cannot be moved further forward, so the forward speed of the vehicle is limited. Further, the bolt 47 can be adjusted up and down by the bolt threads 48 so that the amount of limit of forward speed is adjustable. Of course it will also be understood that the pedal 37 pivots in a counter-clockwise direction about the pivot shaft 41 and from the position shown in FIG. 4, and such direction of pivot will cause the rod 14 to move forwardly and place the lever 13 and spring means in the position shown in FIG. 2, that is in the reverse position.

Further, when the pedal 37 is placed in a pivoted position other than that corresponding to the neutral position of the hydrostatic unit 10, then when the operator releases foot pressure on the foot pedal 37, the springs 18 and 19 will cause the hydrostatic unit to return to the neutral position shown in FIG. 1. That is, assuming the pedal 37 to be of the reverse position so that the lever 13 and spring means are in the positions shown in FIG. 2, release of foot pressure on the pedal 37 will permit the spring 18 to move the lever 13 to the positions of the parts shown in FIG. 1. Conversely, if the foot pedal were in the position shown in FIG. 4, the spring 19 would be extended from the position it is shown in FIG. 1, and release of foot pressure on the pedal 37 would then permit the spring 19 to act on the lever 13 to place the parts in the positions shown in FIG. 1.

An adjustment means is provided on the lever 13 so that the desired neutral position can be achieved. Thus the lever 13 includes a bell crank part 49 which is connected to the shaft 11 to rotate therewith, and the lever 13 also includes an arm 51 which is bolted to the member 49 through bolts 52 and 53 extending through the two lever parts mentioned. Further, the arm 51 has a slot 54 receiving the bolt 53 such that upon loosening the bolt 53, the [arm 51] *lever 49* can be pivoted relative to the *arm 51* [lever part 49 and about the axis of the bolt 52]. Such pivotal action adjusts the position of the *bolt 53 relative to* [slot 33 in] the arm 51, and [this] therefore [adjusts the effect of the springs 18 and 19 on the lever 13 so that] the neutral position can be established. However, the spring 19 remains as the stronger spring in its effect on the lever, for the reason and functions described.

Figure 3:
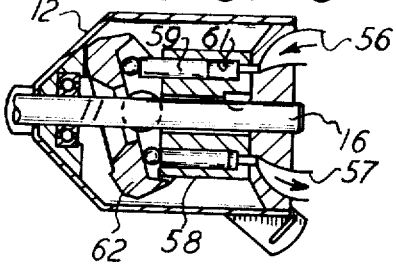
FIG. 3 is a sectional view through the pump section of the unit.

FIG. 3 shows one conventional pump section of the hydrostatic unit, such as the unit 10, and here the housing 12 is shown to have a fluid inlet 56 and a fluid outlet 57. It will further be understood that the hydraulic fluid passing through the pump unit shown in FIG. 3 will be conducted to a hydraulic motor for driving the vehicle, in the conventional arrangement of motor parts and function. Also, the pump section has the input shaft 16 carrying a rotor 58 which has a series of plungers 59 extending into bores 61 in the rotor 58. The bores 61 are in fluid flow communication with the inlet and outlet 56 and 57. Also, a conventional pump swash plate 62 is movably disposed in the housing and the adjacent ends of the plungers 59 abut the swash plate 62 for axial displacement of the plungers in the conventional operation of this type of fluid pump. It will therefore be understood that rotation of the shaft 16 causes the rotor 58 to rotate, and the bores 61 are exposed to the inlet passageway 56 to bring hydraulic fluid into the bores 61. As the plungers 59 rotate from their position adjacent the inlet portion 56 and to the outlet portion 57, the plungers move to the right, as shown in FIG. 3, and therefore pump the hydraulic fluid through the pump, as desired. The swash plate 62 permits this axial movement of the plungers 59, and the control shaft 11 is connected to the swash plate 62 for achieving the desired orientation of the plate 62 relative to the plungers 59 for creating the pumping action described and of a course for also placing the unit in a neutral position where no fluid would be pumped when that position is desired. Characteristic of this type of pump unit, and other hydrostatic units also, is the fact that the unit tends to be self energizing. That is, when it is set in one pumping position, it tends to move further toward the limit of that position. For this reason, the spring means described herein are significant and important in countering this self-energizing tendency, and the spring means will prevent the system from being self energizing and moving progressively in the undesirable manner described. In fact, with the spring means described, the operator must create an increasing force on the foot pedal 37 in order to increase the speed in either direction, and this is desirable so that the vehicle is not inadvertantly or easily moved too fast. Still further, release of foot pressure on pedal 37 will permit the spring means to return the hydrostatic unit to the neutral position, as desired. This is important since the single foot pedal 37 is utilized for setting all three positions of the hydrostatic unit, and the unit of course must pass through the neutral position before it can go to either the forward or reverse position from the opposite position.

Figure 5:
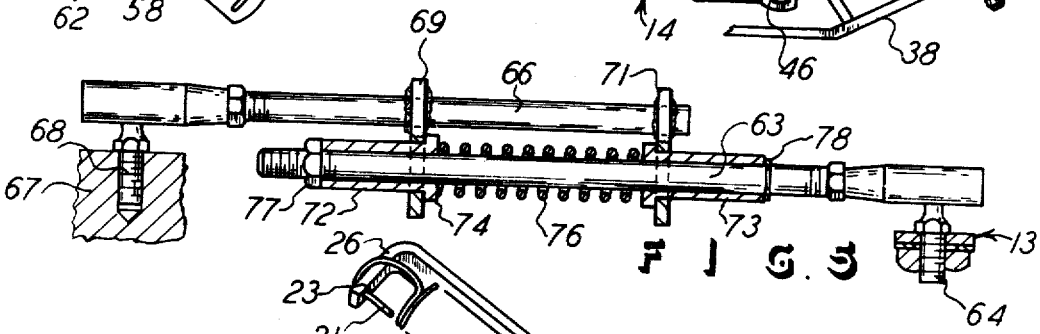
FIG. 5 is a view of another embodiment of this invention, partly in section.

It should be recognized that the spring means, of course including the springs 18 and 19, may take different forms and yet achieve the desired results mentioned. FIG. 5 shows one other way in which spring means can be employed for achieving the arrangement of the spring means for exerting at least a minimum spring force on the control means in all positions of the control. Here it will be seen that a rod 63 is connected to the lever 13 by means of the threaded connector 64 which may extend in place of the bolt 53. Another rod 66 is included in the embodiment, and it is mounted on the vehicle portion 67 by means of a connector 68 on one end of the rod 66. The rod 66 carries two spaced-apart plates 69 and 71 affixed to the rod 66 so that they are stationary relative to the vehicle. Also, the rod 63 has sleeves 72 and 73 slidable on the rod 63, and these sleeves have heads 74 shown in abutment with the plates 69 and 71. A compression spring 76 extends between the sleeves 72 and 73, and an inital tension of, for example ten pounds, is placed in the spring 76 in the position shown in FIG. 5. The rod 63 secures the sleeve 72 by a nut 77 which is adjustable on the threaded end of the rod 63, and a snap ring 78 secures the sleeve 73 to the rod 63.

With this arrangement in FIG. 5, it will therefore be understood that if the control member 13 were in a position to move the rod 63 to the left in FIG. 5, such movement would require a force sufficient to overcome the ten pounds of tension in the spring 76, and this would mean compressing the spring 76 against the then set sleeve 72. Conversely, if the control means were moved in the other direction, that is the rod 63 would be moved to the right in FIG. 5, then again a force sufficient to overcome the ten pounds of tension in the spring 76 would be required to move the rod 63 and compress the spring 76 against the then fixed sleeve 73. In this manner, the spring 76 will hold the unit in the neutral position, which position is shown in FIG. 5, and such position is adjusted by means of the threaded end receiving the nut 77. Also, the further the control is moved to either the forward or the reverse direction, the greater the force is required in overcoming the compression of the spring 76, as is desired. The pump is, of course, a variable volume pump.

In both embodiments shown, the arrangement is such that there is an automatic centering or neutral positioning of the unit, and this not only is sufficiently effective to be achieved when manual control is released, but it also overcomes the inherent and internal friction in any such mechanical system so that the neutral position can be achieved. Further, there is no overshooting of the neutral position since a sufficiently strong force exerted by the spring means will assure an accurate neutral setting when desired. Also, if the vehicle were left on a hill and tended to move under the force of gravity, the present mechanism would be sufficiently forceful to retain the unit in a neutral position and thus resist the gravitational movement, whereas other units would simply begin to let the unit roll in response to the gravitational force, and in fact other units would permit the vehicle to even accelerate in its rolling velocity.

What is claimed is:

1. In a control for a vehicle hydrostatic transmission having selectable positions for controlling the flow of fluid to achieve forward, reverse, and neutral positions, and to govern the speed of the vehicle, and with the neutral position being intermediate the forward and reverse positions, the combination comprising a movable control means operatively connected to said transmission for setting said transmission in the selectable positions, spring means operatively connected to said control means, said spring means being arranged to have at least a minimum spring force applied to said control means in all positions of said control means for yieldingly holding said control means in said neutral position and for yieldingly urging said control means toward said neutral position from both said forward position and said reverse position, [said control means including an adjustable portion interconnected between said spring means and said transmission for setting said minimum spring force by adjusting said portion when the remainder of said control means is in said neutral position,] a foot pedal included in said control means for the operator to manually position in obtaining the selectable positions and governing the speed of the vehicle, a lever included in said control means and being operatively connected to said transmission, said spring means being connected to said lever for yieldingly urging said lever toward said neutral position, said foot pedal being operatively connected to said lever and being movable in two directions for moving said lever against the force of said spring means and into said forward position and said reverse position, said control means including both a rotatable shaft and said lever, said lever being connected to and extending across said shaft and having opposite ends, said spring means being connected to one of said ends of said lever, and said foot pedal being operatively connected to the other of said ends of said lever.

2. In a control for a vehicle hydrostatic transmission having selectable positions for controlling the flow of fluid to achieve forward, reverse, and neutral positions, and to govern the speed of the vehicle, and with the neutral [position] being intermediate the forward and reverse positions, the combination comprising a movable control means operatively connected to said transmission for setting said transmission in the selectable positions, spring means operatively connected to said control means, said spring means being arranged to have at least a minimum spring force applied to said control means in all positions of said control means for yieldingly holding said control means in said neutral position and for yieldingly urging said control means toward said neutral position from both said forward position and said reverse position, said control means including an adjustable portion *operatively associated* [interconnected] between said spring means and said transmission for setting said *transmission in the neutral position* [minimum spring force] by adjusting said portion [when the remainder of said control means is in said neutral position].

3. In a control for a vehicle hydrostatic transmission having selectable positions for controlling the flow of fluid to achieve forward, reverse, and neutral positions, and to govern the speed of the vehicle, and with the neutral position being intermediate the forward and reverse positions, the combination comprising a movable control means operatively connected to said transmission for setting said transmission in the selectable positions, spring means operatively connected to said control means, said spring means being arranged to have at least a minimum spring force applied to said control means in all positions of said control means for yieldingly holding said control means in said neutral position and for *yieldingly* [yielding] urging said control means toward said neutral position from both said forward position and said reverse position, a lever included in said control means and being operatively connected to said transmission and being movable in the two [opposite] directions *toward the opposite sides* [in the plane] of said lever in the respective forward and reverse positions, said spring means being connected to said lever for yieldingly urging said lever toward said neutral position, and manually operative means [on] *operatively associated with* said lever for moving said lever against the force of said spring means and into said forward and reverse positions, and [an adjustable] *a* piece *operatively interconnected between* [on] said lever and [connected to] said spring means and being *with said lever being adjustably connected to said piece to be* movable *relative to said piece* along the plane of the force of said spring means for adjusting *said transmission to said neutral position* [the force of said spring means on said lever].

4. In a control for a vehicle hydrostatic transmission having selectable positions for controlling the flow of fluid to achieve forward, reverse, and neutral positions, and to govern the speed of the vehicle, and with the neutral position being intermediate the forward and reverse positions, said transmission having a movable control means for setting the transmission in said selectable positions, and spring means operatively connected to said control means, the improvement comprising two fixed spaced-apart anchor points included in said control, at least a portion of said movable control being disposed intermediate said anchor points and being movable toward and away from both said anchor points, a tension coil spring anchored on one of said anchor points and being connected to said portion of said movable control means, another tension coil spring being anchored on the other of said anchor points and being connected to said portion of said movable control means, said springs being disposed and effective to exert their spring force on said portion in opposite directions, one of said two springs being stronger than the other, and both said springs being arranged to exert an equal but opposite spring tension force on said portion of said control means when said transmission is in said neutral position, and with the weaker of said two springs being stretched under tension in said neutral position to produce its said equal but opposite force, and with the stronger of said springs being *free of stretched into tension in said neutral position* [pre-set with an initial spring force prior to being stretched] to produce its said equal but opposite force [in said neutral position, said control means including an adjustable portion interconnected between said spring means and said transmission for setting said minimum spring force by adjusting said portion when the remainder of said control means is in said neutral position].

5. The subject matter of claim 4, wherein one of said springs is a coil type spring and is disposed to be in abutment with said portion and with said anchor point when the other of said springs is extended and when the transmission is set in said reverse position of said control means, all [of] *for* blocking axial movement of said one spring and thereby have said one spring present a rigid body between said portion and said anchor point to block movement of said portion beyond a limit of movement into said reverse position.

6. The subject matter of claim 4, *wherein* [including an adjustable piece on] said portion *includes an adjustable member which is operatively associated with* and being connected to at least one of said springs and *is* [being] adjustably movable toward and away from said anchor points for adjusting *said transmission to said neutral position* [the force of said springs on said portion].

References Cited

The following references, cited by the Examiner, are of record in the patented file of this patent or the original patent.

UNITED STATES PATENTS

| | | | |
|---|---|---|---|
| 2,207,435 | 7/1940 | Jones | 74—513 |
| 3,040,596 | 6/1962 | Du Shane et al. | 74—482 |
| 3,313,174 | 4/1967 | Walker et al. | 74—474 |

MILTON KAUFMAN, Primary Examiner

U.S. Cl. X.R.

74—513

UNITED STATES PATENT OFFICE

CERTIFICATE OF CORRECTION

Patent No. RE 27813 Dated November 20, 1973

Inventor(s) Donald G. Haffner

It is certified that error appears in the above-identified patent and that said Letters Patent are hereby corrected as shown below:

In Column 7, line 22, place cancellation brackets around the word "being".

In Column 8, lines 28 and 29, place cancellation brackets around the phrase "and being connected to at least one of".

Signed and sealed this 23rd day of April 1974.

(SEAL)
Attest:

EDWARD M.FLETCHER,JR.
Attesting Officer

C. MARSHALL DANN
Commissioner of Patents